(12) United States Patent
Bornhardt

(10) Patent No.: US 11,411,946 B2
(45) Date of Patent: Aug. 9, 2022

(54) SECURE POINT-TO-POINT INTEGRATION OF CLOUD SYSTEMS

(71) Applicant: SAP SE, Walldorf (DE)

(72) Inventor: Christian Bornhardt, Ettlingen (DE)

(73) Assignee: SAP SE, Walldorf (DE)

( * ) Notice: Subject to any disclaimer, the term of this patent is extended or adjusted under 35 U.S.C. 154(b) by 6 days.

(21) Appl. No.: 16/937,146

(22) Filed: Jul. 23, 2020

(65) Prior Publication Data

US 2022/0029980 A1 Jan. 27, 2022

(51) Int. Cl.
*G06F 13/00* (2006.01)
*H04L 9/40* (2022.01)
*H04W 12/06* (2021.01)
*H04L 65/1069* (2022.01)
*H04L 67/02* (2022.01)

(52) U.S. Cl.
CPC .......... *H04L 63/0823* (2013.01); *H04L 63/10* (2013.01); *H04L 65/1069* (2013.01); *H04L 67/02* (2013.01); *H04W 12/06* (2013.01)

(58) Field of Classification Search
CPC ..... H04L 63/10; H04L 67/02; H04L 65/1069; H04L 63/0823; H04W 12/06
USPC ....... 709/245, 201, 249, 227–229, 225, 230; 713/156, 155; 726/3–6
See application file for complete search history.

(56) References Cited

U.S. PATENT DOCUMENTS

| | | | |
|---|---|---|---|
| 10,574,444 B2* | 2/2020 | Khristi | H04L 67/02 |
| 10,904,314 B2* | 1/2021 | Rice | H04L 67/02 |
| 11,063,750 B2* | 7/2021 | Khristi | H04L 9/3236 |
| 2019/0229900 A1* | 7/2019 | Khristi | H04L 9/3236 |
| 2020/0137138 A1* | 4/2020 | Rice | H04L 61/1511 |
| 2020/0169394 A1* | 5/2020 | Khristi | H04L 9/0827 |
| 2021/0099868 A1* | 4/2021 | Damlaj | H04W 12/06 |
| 2021/0144194 A1* | 5/2021 | Rice | H04L 61/1511 |
| 2021/0160340 A1* | 5/2021 | Narayanan | H04L 9/3239 |

* cited by examiner

*Primary Examiner* — Kenneth R Coulter
(74) *Attorney, Agent, or Firm* — Fountainhead Law Group P.C.

(57) ABSTRACT

Different cloud software applications may be efficiently integrated in a secure manner, by providing each system with a dedicated Integration Setup URL/Endpoint. This endpoint can be derived from the base URL together with an Integration Setup User Interface (UI). Security is afforded through verification of certain properties. Cryptographically secured customer identification (via public key certificates) can ensure that customer A does not connect to systems of customer B. Also, business type information or landscape/zone can be referenced assign a tenant to a software variant (development, test, production). This prevents, e.g., a development system of type A from accidentally being connected to a production system of type B. Integration setup may be triggered per an integration scenario from one of the two affected endpoints, or from a separate (e.g., central) system. The configuration may be written on both sides with reasonable defaults, with the double confirmation ensuring compliance and security.

17 Claims, 5 Drawing Sheets

SECURE POINT-TO-POINT INTEGRATION OF CLOUD SYSTEMS

BACKGROUND

Unless otherwise indicated herein, the approaches described in this section are not prior art to the claims in this application and are not admitted to be prior art by inclusion in this section.

Complex software applications are increasingly being deployed on the cloud, rather than on-premises as in traditional approaches. Access to such cloud software applications may be obtained via Uniform Resource Locator (URL) information. Granting free access to the dedicated URL information of a software program deployed on the cloud, can give rise to security concerns.

Another emerging trend is the increasing desire to integrate complex software applications with other applications as part of a related suite. Conventionally, such integration may be achieved with significant manual effort—e.g., on each application that is being integrated, as well as on the underlying cloud deployment platform.

SUMMARY

According to embodiments, efficient integration of cloud software applications is achieved in a secure manner by providing each system with a dedicated Integration Setup URL/Endpoint. This provided URL/Endpoint can be derived (e.g., deduced) from the base URL. An Integration Setup User Interface (UI) could be offered as well via such a deducible URL, and/or could be available as part of the regular system (administration) UIs.

Security is afforded through verification of certain properties. For example, cryptographically secured customer identification (e.g., via public key certificates) can ensure that customer A does not connect to systems of customer B. Alternatively or in addition to customer identification data, security can be afforded utilizing business type information or landscape/zone. This can assign a particular tenant to a specific software variant (development, test, production), thereby preventing, e.g., a development system of type A from accidentally being connected to production system of type B.

In certain embodiments, the integration setup may be triggered per an integration scenario from one of the two affected endpoints. Alternatively, the integration setup may be triggered from a separate (e.g., central) system.

The configuration may be written on both sides with reasonable defaults. Thus in most cases, it is sufficient to activate the scenario on system A and B. This double confirmation is required to ensure compliance and security.

If needed, prior to activation an administrator can adjust defaulted settings or further configuration for the scenario. Examples can include synchronization mode, synchronization frequency, filter(s) for data to be replicated, mappings, and others.

The following detailed description and accompanying drawings provide a better understanding of the nature and advantages of various embodiments.

DETAILED DESCRIPTION

Described herein are methods and apparatuses that implement the integration of cloud systems. In the following description, for purposes of explanation, numerous examples and specific details are set forth in order to provide a thorough understanding of embodiments according to the present invention. It will be evident, however, to one skilled in the art that embodiments as defined by the claims may include some or all of the features in these examples alone or in combination with other features described below, and may further include modifications and equivalents of the features and concepts described herein.

Figure 1:
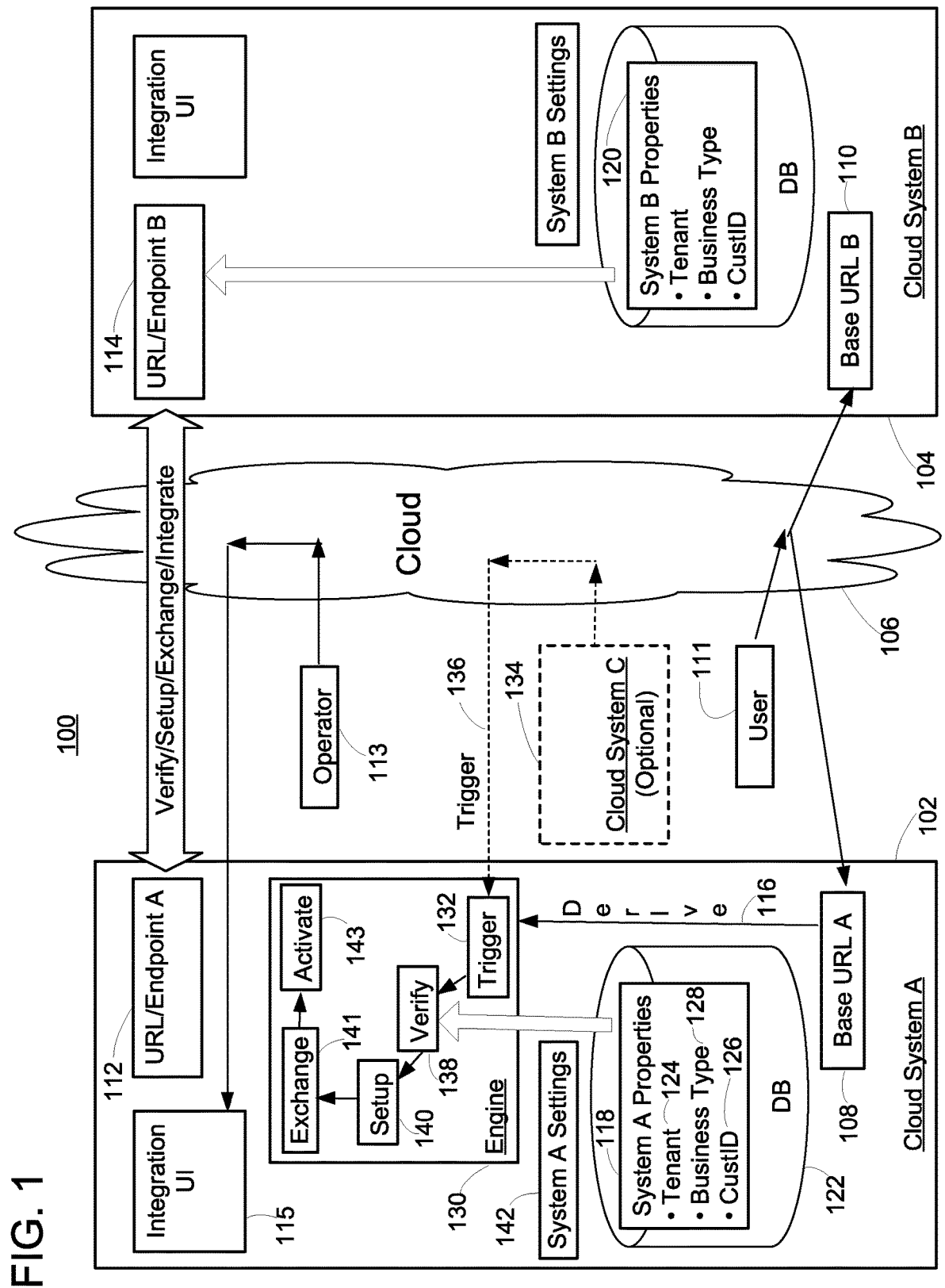
FIG. 1 shows a simplified diagram of a system according to an embodiment.

FIG. 1 shows a simplified view of an example system that is configured to implement the integration of cloud applications according to an embodiment. Specifically, system 100 comprises a first cloud system A 102, and a second cloud system B 104.

Cloud system A is in communication with the cloud 106 via a base URL 108. Cloud system B is in communication with the cloud via a base URL 110.

A user 111 accesses the cloud system(s) via the web utilizing the base URL. Each cloud system also has a respective dedicated Integration Setup URL/Endpoint 112, 114.

This URL/Endpoint can be derived 116 (e.g., by a process of deduction) out of the base URL of the system according to a predetermined manner. The URL/Endpoint allows for machine-to-machine communication. In addition, it can provide an integration operator 113 with access to an Integration User Interface (UI) 115.

Each cloud system also has a number of specific properties 118, 120. The properties may be stored in a non-transitory computer readable storage medium such as a database (e.g., database 122 of cloud system A). However, this is not required in all embodiments, and properties could be stored in structures such as:

a file system on a local or remote disk,
a USB stick,
a trusted platform module (TPM), and/or
another type of memory device.

One system property 124 relates to tenants. This indicates that access to a particular system (or customer-specific parts of a system) is to be by tenants of a customer, who are grouped within a particular landscape/zone.

Another property 126 is a cryptographically secured customer identification. Implemented via e.g., public key certificates, this ensures that customer A does not connect to systems of customer B.

Still another system property is business type 128. This property indicates the variety of the system. Possible example choices for business types, can include but are not limited to:

Development (DEV) systems having less that full capabilities and which are not fully implemented;
Test (TEST) systems which are not fully implemented;
Production (PROD) systems having full capabilities and which are fully implemented.

One or more of the system properties may be considered by a processing engine 130 engine in conducting a verification as to whether a process of integration between the cloud systems may proceed or should be aborted. For example, consideration of the customer ID can prevent a cloud system of customer A from accidentally integrating with a cloud system of customer B.

In another aspect, consideration of the business type can prevent DEV system of type A from accidentally being connected to PROD system of type B. This can involve blocking the integration, or going the extra step of issuing a warning and requesting confirmation prior to proceeding with the integration setup.

In a first phase, the integration is initially triggered 132 by the engine of the cloud system A. Alternatively, however, the integration setup may be triggered out of a third System C 134, rather than System A or B. This System C then triggers 136 the setup via System A or B (or potentially as proxy). For security reasons, then in both Systems A and B an admin of each system may confirm and activate the integration (and maintain mandatory settings if required).

After triggering, System A connects to System B via the Endpoint/URL and verifies 138 system properties—e.g., same customer, same Business Type (e.g. TEST or PROD). If the verification is not successful, then the integration setup is aborted.

Next, the System A requests setup 140 of a particular integration scenario (e.g., "Cost Center Synchronization"). If that particular integration scenario is not supported by the target System B, then the integration setup is aborted.

Now, the cloud systems automatically exchange 141 data/parameters required for the integration scenario and maintain settings including but not limited to:
Communication Scenarios,
URLs,
Users.
These settings 142 are stored in System A and B in an inactive state.

If called for by the particular integration scenario, the operator may maintain in System A mandatory business settings (e.g., filter for Cost Centers to be replicated, replication frequency) and activate 143 the integration scenario. This will remove locks e.g. of communication users.

Operator may access System B. In the integration Setup UI, inactivate scenario is shown. If called for by the particular integration scenario, the operator may maintain mandatory business settings in System B (e.g. filter for Cost Centers to be replicated) and activate scenario. Settings to be applied (like Users & permissions) can be shown upfront/be adjusted.

Afterwards locks (e.g., of communication users) will get removed. The integration setup between the cloud Systems A and B is now completed.

It is noted that the integration setup is triggered per the integration scenario (e.g. "Cost Center Replication") from one of the two affected endpoints. Configuration may be written on both sides with reasonable defaults. So, in most cases, it is sufficient to activate the scenario on system A and B. This double-confirmation can ensure compliance and security.

If needed, before activation, an administrator can adjust defaulted settings or further configuration for the scenario. Examples can include but are not limited to sync mode, sync frequency, filter for data to be replicated, mappings, and others.

Certain aspects of the particular embodiment of FIG. 1 are noted. First, the Integration Setup URL could be built as well using a dedicated port (including possible additional security measures taken to implement a firewall).

Second, the Integration Setup UI can (but does not have to) be available via Integration Setup URL. According to some embodiments the Integration Setup UI can be part of regular system UIs.

Figure 2:
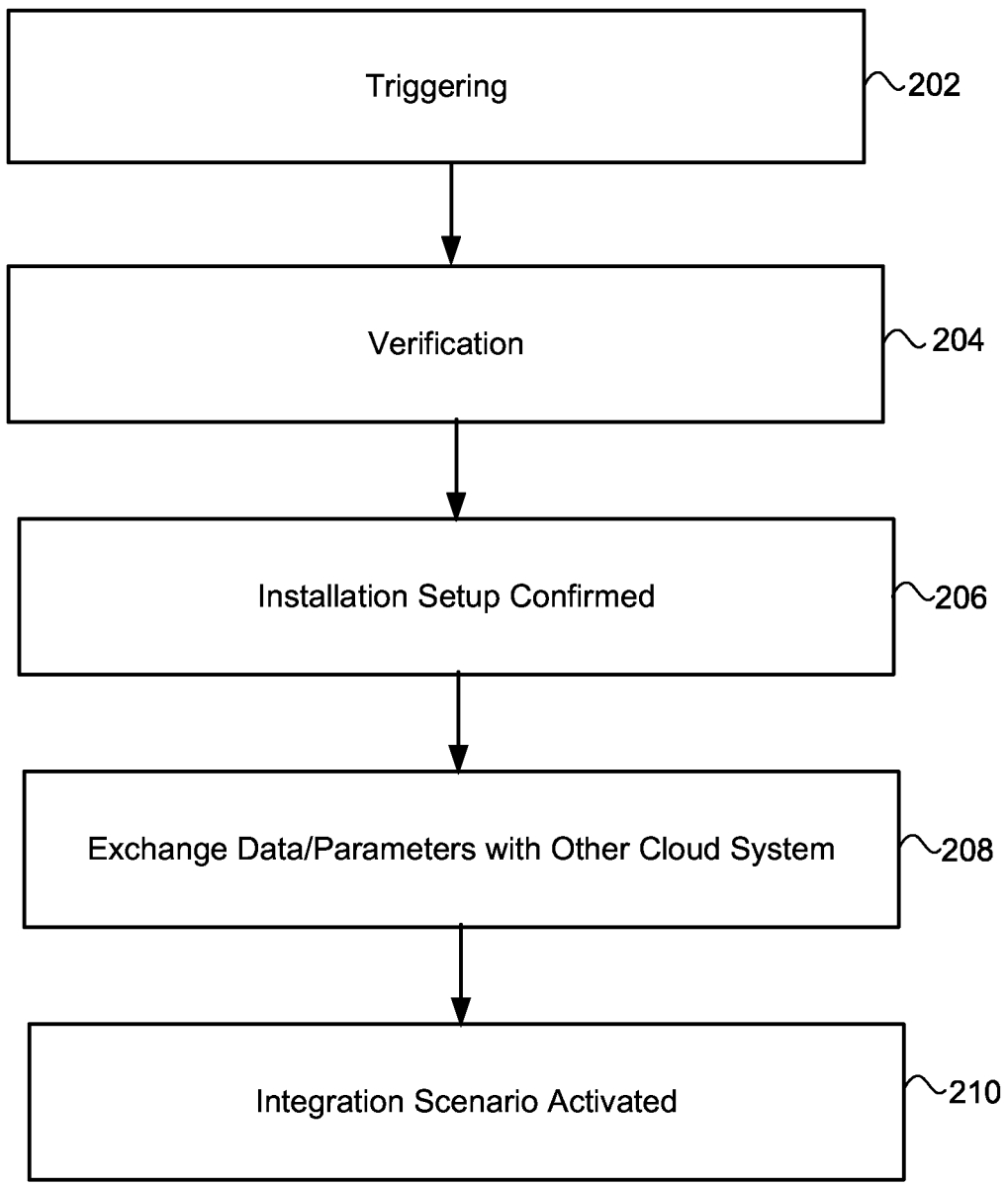
FIG. 2 shows a simplified flow diagram of a method according to an embodiment.

FIG. 2 is a flow diagram of a method 200 according to an embodiment. At 202, an integration process is triggered (e.g., by a trigger signal).

At 204, in response to the integration trigger signal, a system property of a first system having a first Endpoint/URL is verified against a system property of a second system having a second Endpoint/URL.

At 206, following verification, an installation setup scenario is confirmed in the second system via the second Endpoint/URL. At 208, data exchanged from the second system is received and stored in a database of the first system in an inactive state.

At 210, an installation setup scenario is activated and the cloud Systems A and B are now integrated via their respective Endpoint/URLs.

Further details regarding the integration of cloud systems according to various embodiments, are now provided in connection with the following example.

EXAMPLE

Figure 3:
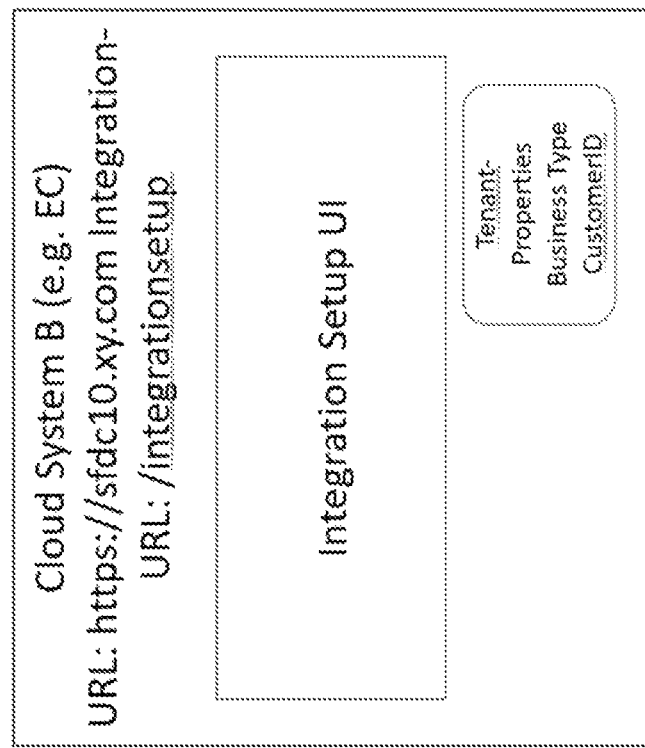
FIG. 3 is a simplified block diagram illustrating the integration of two cloud systems according to a specific example.
Figure 3:
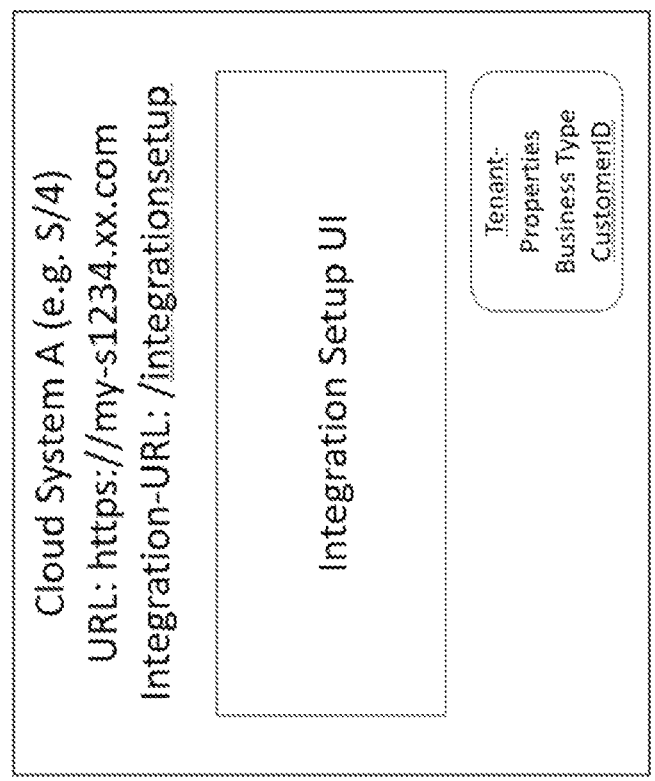

FIG. 3 illustrates a sample cloud deployment of two distinct software applications that are to be integrated with one another as part of a suite:
Cloud System A: S/4Hana Cloud (S4HC) in-memory database system available from SAP SE of Walldorf, Germany; URL/Endpoint for cloud integration purposes:
   URL: https://my-s1234.xx.com Integration-URL:/integrationsetup
Cloud System B: Employee Central (EC) module of SAP SuccessFactors BizX Suite software also available from SAP SE; URL/Endpoint for cloud integration purposes:
   URL: https://sfdc10.xy.com Integration-URL:/integrationsetup.

In this example, it is noted that according to certain embodiments the integration setup URL could as well be built using a dedicated port, e.g.:
   URL: https://my-s1234.xx.com:8077/iSetup.
Such an approach could involve additional effort to provide security features such as implementing appropriate firewalls.

According to some embodiments, systems may not be connected directly, but rather indirectly via middleware such as SAP Process Integration (PI). Such embodiments can be applied as well by integrating System A with the middleware as well integrating System B with the middleware.

As for the SAP Cloud Platform (SCP) PI integration content set up, this can involve defining connectivity settings (e.g., credentials, Oauth). Also, the integration package must be deployed and configured (e.g., scheduling and maintaining system URLs).

In this particular example, setup of the integration is triggered directly in one of the systems, without involvement of a separate (third) system. Specifically, setup of the integration in System A is triggered in "Cost Center Synchronization" using the Integration Setup UI.

It is noted that according to other embodiments, rather than triggering the integration setup out of System A or System B, the triggering could instead occur out of another (e.g., central) System C—e.g., as optionally shown in FIG. 1. According to such embodiments, this System C triggers the setup via System A or B (or potentially as proxy).

Then, for security reasons, in both Systems A and B an administrator of each system may confirm and activate the integration (and if required, maintain mandatory settings). In specific embodiments, candidates for such a System C could include but are not limited to the following products available from SAP SE:

CBC (Central Business Configuration),
Cloud Application Lifecycle Management (CALM),
SAP for Me.

Returning to the specific two-system example of FIG. 3, the result of triggering is that the System A connects to the System B via Integration-Setup-URL shown in FIG. 3:

URL: https://sfdc10.xy.com Integration-URL:/integrationsetup

Then, System A verifies tenant properties of the System B. Examples of such properties can include confirming the same customer, the same Business Type (e.g. TEST or PROD). If this confirmation is not successful, then the setup process is aborted.

System A then requests setup of the particular Integration Scenario, e.g. "Cost Center Synchronization". If this particular integration scenario is not supported by the target System B, then the setup process is aborted.

Next, the Systems A and B automatically exchange data/parameters required for the integration scenario, and maintain settings such as Communication Scenarios, URLs, Users. Settings are stored in Systems A and B in an inactive state.

If required by a particular Installation Scenario, the operator maintains mandatory business settings in the System A (e.g., filter for Cost Centers to be replicated, replication frequency), and activates the scenario. This will remove locks (e.g., of communication users).

Now, the operator of System B accesses System B. In the integration Setup UI, inactive scenario is shown. If required by the installation scenario, the operator of System B has to maintain mandatory business settings in System B (e.g. filter for Cost Centers to be replicated) and activate scenario—settings to be applied like Users and permissions will be shown upfront/can be adjusted.

Afterwards, locks (e.g., of communication users) will get removed. The integration setup for this example is now completed.

This example offers significantly reduced effort for integration over conventional approaches. That is, rather than consuming hours of hours of (cumbersome) manual work, only a few minutes are required to trigger the integration, adjust/confirm parameters, and activate the integration on both ends.

More specifically, in this particular example manual configuration of the EC system would involve providing connectivity to the API user, and configuring solutions according to S4HC integration requirements. These can include conforming to the data model (e.g., field length) and to code values (e.g., salutation).

With regards to the S4HC configuration, connectivity settings must be defined. These can include the communication system (e.g., to define multiple end points), and the communication arrangement (e.g., to define filters and mappings).

It is noted that embodiments dispense with the need to define N*M integration setup procedures in order to support N products connected to M products for one integration type. Instead, each system only has to implement for supported integration scenarios (like "Cost Center"). And, such integration scenarios could become (industry) standards to connect SAP and non-SAP systems (standardized data model).

Returning now to FIG. 1, there the particular embodiment is depicted with the engine responsible for integration of cloud systems as being located outside of the database. However, this is not required.

Rather, alternative embodiments could leverage the processing power of an in-memory database engine (e.g., the in-memory database engine of the HANA in-memory database available from SAP SE), in order to perform various functions.

Figure 4:
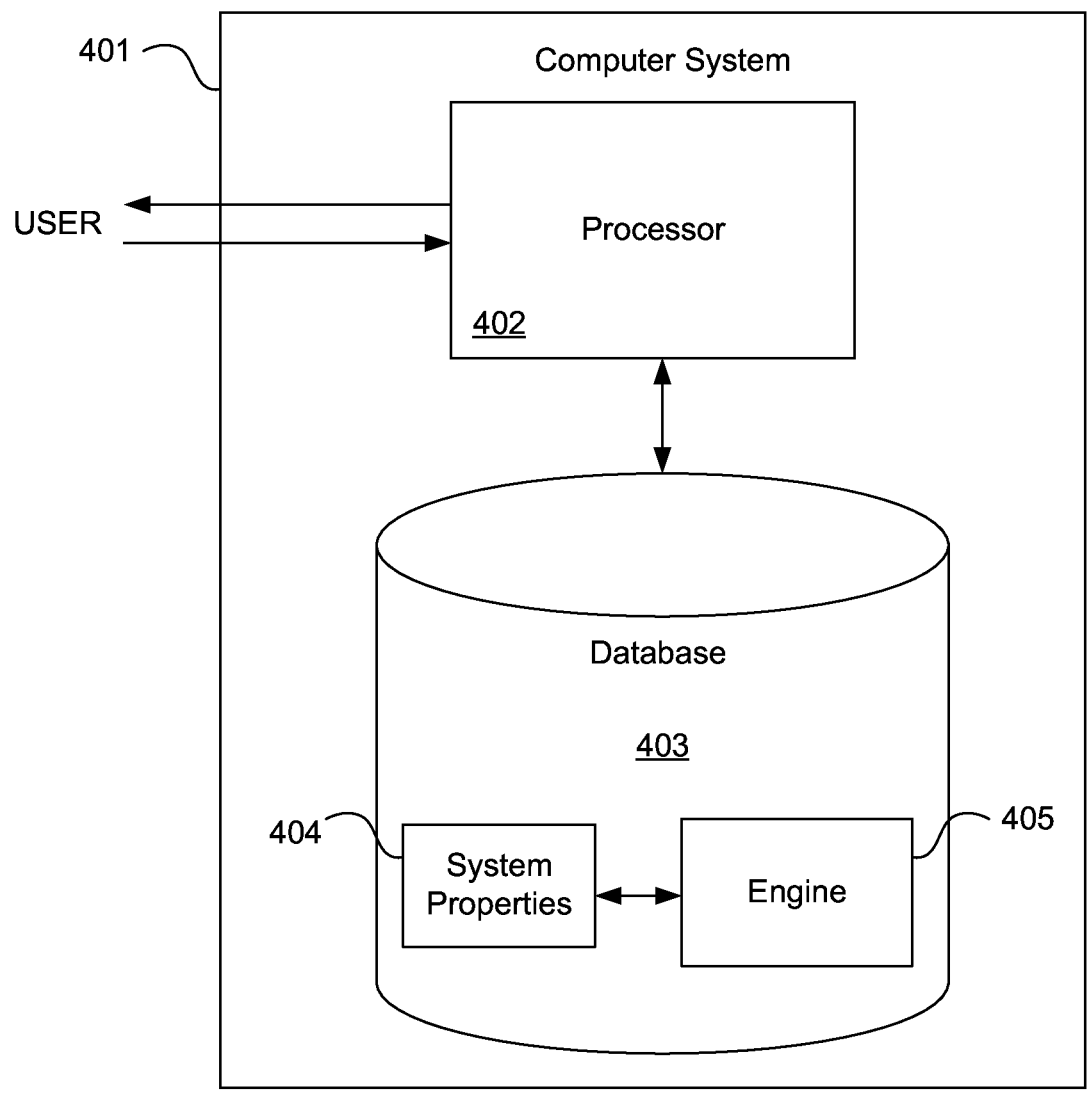
FIG. 4 illustrates hardware of a special purpose computing machine according to an embodiment that is configured to implement the integration of cloud systems.

Thus FIG. 4 illustrates hardware of a special purpose computing machine configured to implement access control according to an embodiment. In particular, computer system 401 comprises a processor 402 that is in electronic communication with a non-transitory computer-readable storage medium comprising a database 403. This computer-readable storage medium has stored thereon code 405 corresponding to an engine. Code 404 corresponds to a system property. Code may be configured to reference data stored in a database of a non-transitory computer-readable storage medium, for example as may be present locally or in a remote database server. Software servers together may form a cluster or logical network of computer systems programmed with software programs that communicate with each other and work together in order to process requests.

Figure 5:
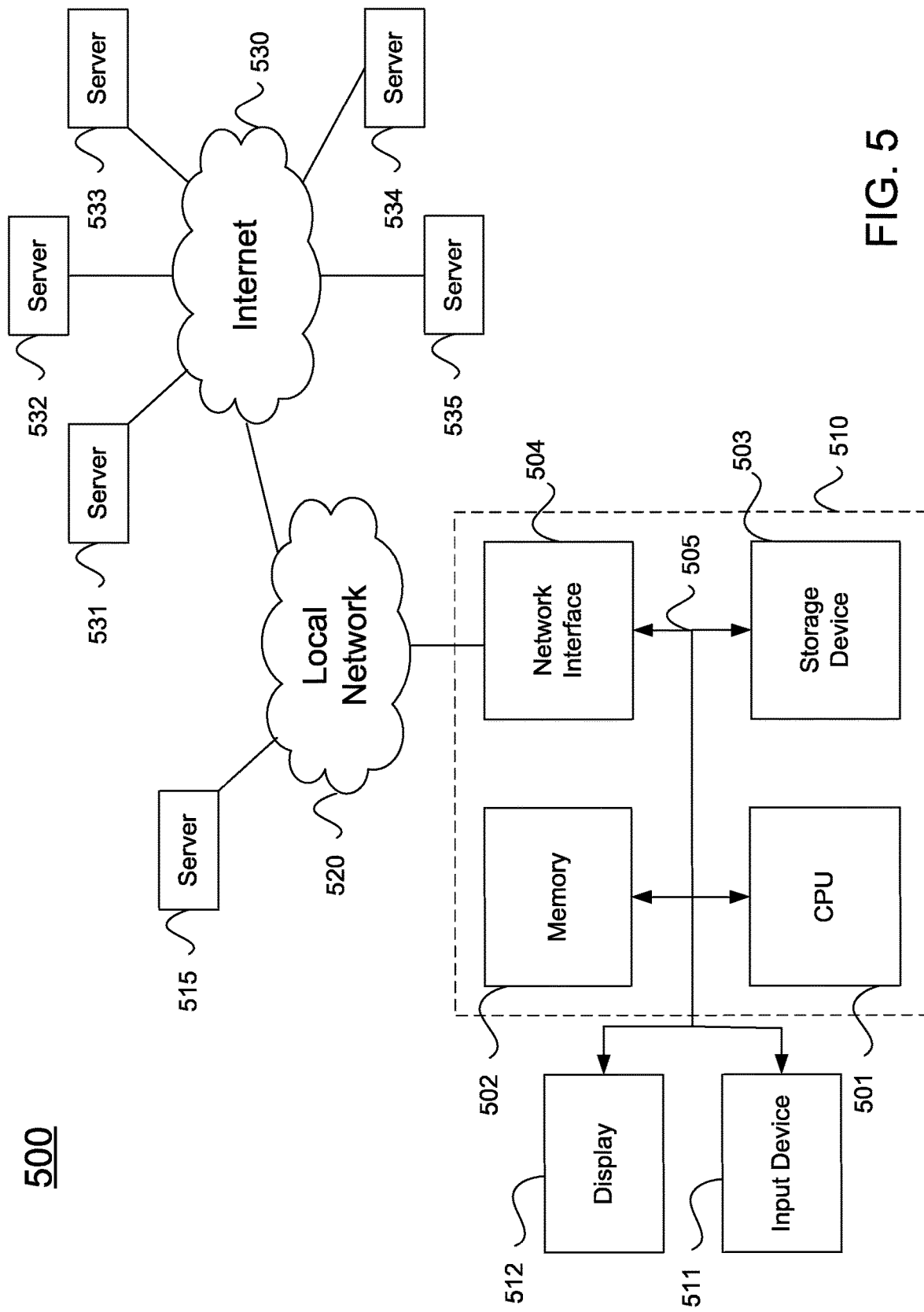
FIG. 5 illustrates an example computer system.

An example computer system 500 is illustrated in FIG. 5. Computer system 510 includes a bus 505 or other communication mechanism for communicating information, and a processor 501 coupled with bus 505 for processing information. Computer system 510 also includes a memory 502 coupled to bus 505 for storing information and instructions to be executed by processor 501, including information and instructions for performing the techniques described above, for example. This memory may also be used for storing variables or other intermediate information during execution of instructions to be executed by processor 501. Possible implementations of this memory may be, but are not limited to, random access memory (RAM), read only memory (ROM), or both. A storage device 503 is also provided for storing information and instructions. Common forms of storage devices include, for example, a hard drive, a magnetic disk, an optical disk, a CD-ROM, a DVD, a flash memory, a USB memory card, or any other medium from which a computer can read. Storage device 503 may include source code, binary code, or software files for performing the techniques above, for example. Storage device and memory are both examples of computer readable mediums.

Computer system 510 may be coupled via bus 505 to a display 512, such as a cathode ray tube (CRT) or liquid crystal display (LCD), for displaying information to a computer user. An input device 511 such as a keyboard and/or mouse is coupled to bus 505 for communicating information and command selections from the user to processor 501. The combination of these components allows the user to communicate with the system. In some systems, bus 505 may be divided into multiple specialized buses.

Computer system 510 also includes a network interface 504 coupled with bus 505. Network interface 504 may provide two-way data communication between computer system 510 and the local network 520. The network interface 504 may be a digital subscriber line (DSL) or a modem to provide data communication connection over a telephone line, for example. Another example of the network interface is a local area network (LAN) card to provide a data communication connection to a compatible LAN. Wireless links are another example. In any such implementation, network interface 504 sends and receives electrical, electromagnetic, or optical signals that carry digital data streams representing various types of information.

Computer system 510 can send and receive information, including messages or other interface actions, through the network interface 504 across a local network 520, an Intranet, or the Internet 530. For a local network, computer system 510 may communicate with a plurality of other computer machines, such as server 515. Accordingly, computer system 510 and server computer systems represented by server 515 may form a cloud computing network, which may be programmed with processes described herein. In the Internet example, software components or services may reside on multiple different computer systems 510 or servers 531-535 across the network. The processes described above may be implemented on one or more servers, for example. A server 531 may transmit actions or messages from one component, through Internet 530, local network 520, and network interface 504 to a component on computer system 510. The software components and processes described above may be implemented on any computer system and send and/or receive information across a network, for example.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A method comprising:
receiving an integration trigger signal;
in response to the integration trigger signal, verifying a first system property of a first system having a first base URL and a first Endpoint/URL, against a second system property of a second system having a second base URL and a second Endpoint/URL, wherein the first system property is stored in a non-transitory computer readable storage medium;
following verification, confirming an installation setup in the second system via the first Endpoint/URL and the second Endpoint/URL:
receiving and storing in an inactive state, data exchanged from the second system via the first Endpoint/URL and the second Endpoint/URL; and
activating the data exchanged from the second system,
wherein the first system property of the first system is a test system type that is different from a development system type, and the second system property is the test system type.

2. The method as in claim 1 wherein the verifying considers the first system property of the first system in combination with another system property of the first system.

3. The method as in claim 2 wherein the another system property comprises a customer identifier.

4. The method as in claim 2 wherein the another system property determines a tenant.

5. The method as in claim 1 wherein the integration trigger signal is received from a third system.

6. The method as in claim 1 further comprising deriving the first Endpoint/URL of the first system from the first base URL of the first system.

7. The method as in claim 1 wherein:
the non-transitory computer readable storage medium comprises an in-memory database; and
the verifying is performed by an in-memory database engine of the in-memory database.

8. A non-transitory computer readable storage medium embodying a computer program for performing a method, said method comprising:
in response to an integration trigger signal, verifying a combination of system properties of a first system having a first base URL and a first Endpoint/URL, against a combination of system properties of a second system having a second base URL and a second Endpoint/URL, wherein the combination of system properties of the first system is stored in a database;
following verification, confirming an installation setup in the second system via the first Endpoint/URL and the second Endpoint/URL:
receiving and storing in an inactive state, data exchanged from the second system via the first Endpoint/URL and the second Endpoint/URL; and
activating the data exchanged from the second system,
wherein the combination of system properties of the first system includes a test system type that is different from a development system type, and a second system property that is the test system type.

9. The non-transitory computer readable storage medium as in claim 8 wherein the combination of system properties of the first system includes a customer identifier.

10. The non-transitory computer readable storage medium as in claim 9 wherein the customer identifier comprises a public key certificate.

11. The non-transitory computer readable storage medium as in claim 8 wherein the combination of system properties of the first system identifies a tenant.

12. The non-transitory computer readable storage medium as in claim 8 wherein the integration trigger signal is received from a third system.

13. The non-transitory computer readable storage medium as in claim 8 wherein the method further comprises deriving the first Endpoint/URL from the first base URL.

14. A computer system comprising:
one or more processors;
a software program, executable on said computer system, the software program configured to cause an in-memory database engine of an in-memory database to:
in response to an integration trigger signal, verify a first system property of a first system having a first base URL and a first Endpoint/URL, against a second system property of a second system having a second base URL and a second Endpoint/URL, wherein the first system property is stored in the in-memory database;
following verification, confirm an installation setup in the second system via the first Endpoint/URL and the second Endpoint/URL:
receive and store in an inactive state, data exchanged from the second system via the first Endpoint/URL and the second Endpoint/URL; and
activate the data exchanged from the second system,
wherein the first system property of the first system is a test system type that is different from a development system type, and the second system property is the test system type.

15. The computer system as in claim 14 wherein the in-memory database engine is further configured to derive the first Endpoint/URL from the first base URL.

16. The computer system as in claim 14 wherein the integration trigger signal is received from a third system.

17. The computer system as in claim 14 wherein a system identifier is selected from a customer identifier.

* * * * *